T. MIDGLEY, Sr., AND T. MIDGLEY, Jr.
TIRE CORE.
APPLICATION FILED AUG. 4, 1919.
1,346,231. Patented July 13, 1920.
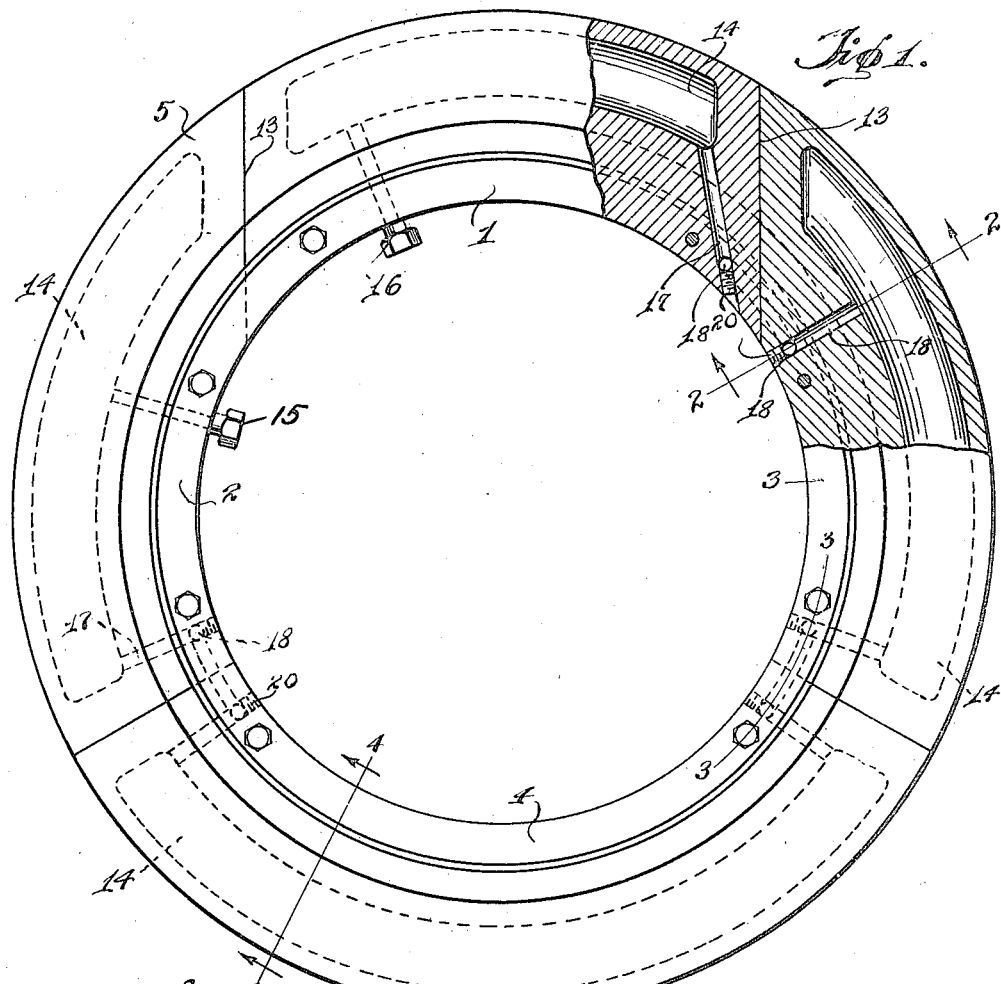
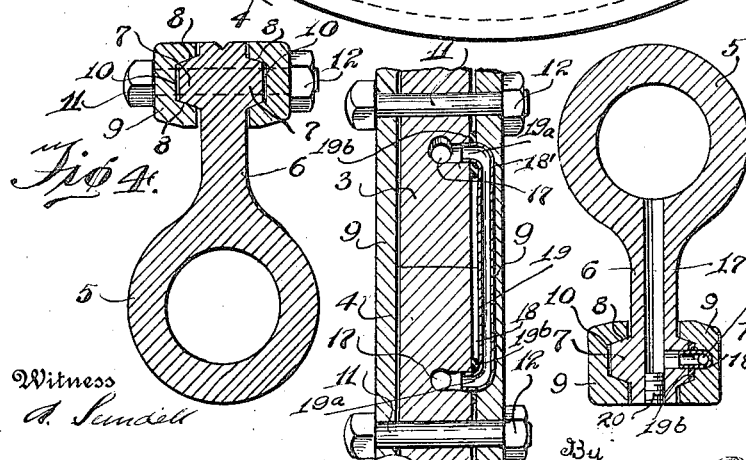

UNITED STATES PATENT OFFICE.

THOMAS MIDGLEY, SR., OF COLUMBUS, AND THOMAS MIDGLEY, JR., OF DAYTON, OHIO, ASSIGNORS TO THE FISK RUBBER COMPANY, OF CHICOPEE FALLS, MASSACHUSETTS, A CORPORATION OF MASSACHUSETTS.

TIRE-CORE.

1,346,231.     Specification of Letters Patent.     Patented July 13, 1920.

Application filed August 4, 1919. Serial No. 315,113.

*To all whom it may concern:*

Be it known that THOMAS MIDGLEY, Sr., and THOMAS MIDGLEY, Jr., citizens of the United States, residing at Columbus and Dayton, in the counties of Franklin and Montgomery and State of Ohio, have invented certain new and useful Improvements in Tire-Cores, of which the following is a specification.

This invention relates broadly to tire cores, and has particular reference to a collapsible core of the type designed for use in the manufacture of pneumatic tire cases, the object of the invention being to povide a structure of this nature to which a heating medium is adapted to be applied, whereby the time required in the vulcanizing the tires may be considerably reduced by the preheating of the same on the cores and a better product effected.

Another object of the invention is to provide a tire core wherein is embodied a plurality of core sections shaped, when in assembled relation, to constitute a ring or annulus, and to provide novel means for affording a circulation of a heating medium through at least certain of said core sections so that heat may be applied to and radiated from said core.

A further object of the invention resides in a tire core wherein the substantially segmental sections are of hollow form and are bound together with means of a pair of opposed ring like clamps and to locate said clamps in such manner that a circulation of a heating medium may be established between the joints of said sections and thence through the hollow interiors thereof.

A still further object of the invention resides in a tire core wherein an improved circulation of the heating medium obtains and to so construct the several sections of the core so that the principles of the invention may be applied to existing standard forms of tire cores.

With these and other objects in view, as will appear as the description proceeds, invention accordingly consists in the novel features of construction, combination of elements and arrangement of parts, hereinafter to be fully described and to have the scope thereof pointed out in the appended claims.

In the accompanying drawing, forming a part of this specification, and in which similar characters of reference denote like and corresponding parts:

Figure 1 is a side elevation of a tire core constructed in accordance with the preferred principles of the present invention, parts thereof being shown in section, Fig. 2 is a transverse sectional view taken along the line 2—2 of Fig. 1, Fig. 3 is a horizontal sectional view taken along the plane disclosed by the line 3—3 of Fig. 1, and Fig. 4 is a transverse sectional view taken along the line 4—4 of Fig. 1.

Referring more particularly to the details of the invention, the core is composed of four sections, the section 1 constituting what will be termed the key section and the remaining sections 2, 3 and 4 being of such form as to complete an annulus when the same are in assembled relation with the key section. It will be understood that the key section has its ends so formed that when removed from the annulus the remaining sections may also be dismantled in an inward direction, thus serving to facilitate the removal of the core from within a completed tire. Each of the sections is provided with the usual enlarged outer bead 5 which is of substantially circular cross sectional form and which terminates in a web 6 upon the opposite sides of which are formed offset ribs 7, the latter having tapering faces 8. The abutting ends of these various sections are constructed so that when they are assembled, a circumferential separation between ends will be prevented by means of a plurality of opposed clamping rings 9. These rings are provided with annular grooves 10, which are shaped so as to receive the rim 7, and transverse bolts 11 are arranged to pass through alined openings formed in the core sections and in said rings; and by means of nuts 12 said rings may be brought to compressively bear upon the web portions of said sections so as to rigidly maintain the latter in assembled relation and prevent all possibility of accidental circumferential separation. It will thus be apparent that to dismantle the core it is simply necessary to remove the clamping rings from engagement therewith, this permitting the key section to be drawn inwardly. It will be noted that in the specific type of core shown, the details of which, except the means for obtaining a circulation of the heating medium, form no part of my invention, said key section is provided with parallel end faces 13 which, by engaging with similar faces on the adjacent sections 2 and 3, permit the key section to be drawn inwardly so that the remaining sections may be collapsed. The meeting faces between the sections 2, 3 and 4 are as shown, substantially radial with the axis of the core when the sections are assembled, and hence the provision of the key section for the purpose of rendering the core collapsible.

The core sections are preferably of hollow form and are each provided with a chamber 14 into which a heating medium is adapted to be introduced to effect the heating of the core and the consequent preheating of a tire formed thereon. To this end the section 2 may be provided with an inlet pipe 15 which connects the chamber 14 thereof with a suitable exterior source of heat supply, and the section 1 is similarly equipped with an outlet pipe 16, by virtue of which the heating medium is led from the core. It is the primary purpose of the present invention to provide means for affording a circulation of the heating medium through the various chambers of the core sections, so that a continuous circulation of the heating medium will obtain within the core. To this end, at least certain of the abutting ends of said sections are equipped with angular bores or passageways 17 which terminate in laterally offset bores 18, the latter being transversely formed in one or more of the ribs 7. Formed in one or more of the rings 9 are recesses 18' which are so situated as to be in open communication with the grooves 10 and of such length as to bridge a coöperating pair of bores 18 of a section joint. Disposed to occupy the recesses 18' are short metallic tubes 19 which are preferably formed, though not necessarily, from copper and these tubes are in turn provided with inwardly directed offset extremities 19ª, which are adapted to project into the bores 18 and in this manner to communicate with the heating chambers 14, so that a circulation of the heating medium between the joints of said sections may be established. The extremities 19ª of said tubes are further equipped with gaskets 19ᵇ which are adapted to be interposed between the perpendicular walls of the ribs 7 and the adjacent walls of the grooves 10, whereby when the rings are clamped into engagement with said sections, the extremities 19ª of said tubes will be positively positioned and firmly held within the bores 18 and, through the provision of the gaskets 19ᵇ, a fluid tight joint will be established and waste or escape of the heating medium thus prevented. The ends of the bores 17 may be closed through the provision of threaded plugs 20.

From the foregoing description taken in connection with the accompanying drawing, it will be apparent that there is provided a core in which an improved circulation of a heating medium is obtained, and that this principle of heat circulation can be produced in cores of standard design and with but a minimum amount of expense and labor. The present invention particularly comprehends means whereby the circulation of the heating medium between the joints of the sections is effected through the coöperation of the clamping ring structure and in this respect the invention differs from the construction set forth in the application of Thomas Midgley, Sr., filed March 19, 1914, Serial Number 283,534.

What we claim is:

1. In a collapsible core, a plurality of core sections shaped to form an annulus when in assembled relation, the interiors of said sections being of substantially hollow form, means whereby a heating medium is capable of being introduced into the various sections, and means for holding the various sections in assembled relation, said latter means being capable of permitting of the circulation of the heating medium between the meeting joints of said sections.

2. In a collapsible core, a plurality of core sections shaped to constitute an annulus when in assembled relation, the interiors of said sections being of hollow form, clamping means for maintaining said sections in concentrically assembled relation, and means whereby a heating medium may be circulated through at least certain of said sections and through a part of said clamping means.

3. In a collapsible core, a plurality of core sections shaped to embody an annulus when in assembled relation, the interior of said sections being of substantially hollow form, the ends of at least certain of said sections being formed with bores connecting the interior of the sections with points exterior thereof, a clamping ring structure arranged to engage with said sections to maintain the latter in assembled relation, and said clamping ring structure being disposed to form a duct for establishing communication between the bores of adjacent sections, whereby a heating medium may be circulated through jointly related sections.

4. In a collapsible core, a plurality of core sections shaped to constitute an annulus when in assembled relation, each of said sections being formed with an interiorly situated chamber and said sections being further formed with bores for establishing communication between said chambers and points exterior of said sections, ribs formed upon said sections, clamping rings coöperative with said ribs for maintaining said sections in assembled relation, said rings being arranged to coöperate with recesses formed in said ribs, whereby ducts are provided for connecting the bores of adjacent sections.

In testimony whereof we affix our signatures.

THOMAS MIDGLEY.
THOMAS MIDGLEY, JR.

Witnesses:
WILHELMINA E. ROGERS,
C. A. SCOLLARD,
M. E. GREENE,
C. M. KRAMER.